(12) United States Patent
Partanen et al.

(10) Patent No.: US 7,906,061 B2
(45) Date of Patent: Mar. 15, 2011

(54) BUBBLE-FREE CROSS-SECTIONS FOR USE IN SOLID IMAGING

(75) Inventors: Jouni P. Partanen, Santa Monica, CA (US); Raymond M. Soliz, Escondido, CA (US); Dennis F. McNamara, Jr., Charlestown, NH (US); Charles R. Sperry, Florence, MA (US); Charles W. Hull, Santa Clarita, CA (US)

(73) Assignee: 3D Systems, Inc., Rock Hill, SC (US)

( * ) Notice: Subject to any disclaimer, the term of this patent is extended or adjusted under 35 U.S.C. 154(b) by 719 days.

(21) Appl. No.: 11/375,917

(22) Filed: Mar. 15, 2006

(65) Prior Publication Data

US 2006/0249884 A1 Nov. 9, 2006

Related U.S. Application Data

(63) Continuation-in-part of application No. 11/121,348, filed on May 3, 2005, now abandoned.

(51) Int. Cl.
*B29C 35/08* (2006.01)
*B29C 41/02* (2006.01)

(52) U.S. Cl. ..................... 264/401; 425/174.4

(58) Field of Classification Search .................. 264/308, 264/313, 316, 401; 425/174.4
See application file for complete search history.

(56) References Cited

U.S. PATENT DOCUMENTS

| 5,158,858 | A | | 10/1992 | Lawton et al. |
| 5,175,077 | A | | 12/1992 | Grossa |
| 5,192,559 | A | | 3/1993 | Hull et al. |
| 5,637,169 | A | * | 6/1997 | Hull et al. ...................... 156/155 |
| 5,650,260 | A | * | 7/1997 | Onishi ........................... 430/269 |
| 5,958,468 | A | * | 9/1999 | Kunkel et al. ............... 425/174.4 |
| 6,547,552 | B1 | * | 4/2003 | Fudim ......................... 425/174.4 |
| 2002/0153640 | A1 | | 10/2002 | John |
| 2007/0018362 | A1 | * | 1/2007 | Heidari et al. ................ 264/496 |

FOREIGN PATENT DOCUMENTS

| DE | 4430374 | 4/1995 |
| DE | 19957370 A1 | 11/1999 |
| DE | 199 57 370 A1 | 6/2001 |
| EP | 0557051 | 8/1993 |
| JP | 63 312130 A | 4/1969 |

OTHER PUBLICATIONS

Rajan et. al, CAD Model Slicing and Surface Smoothing for Building Rapid Prototyping Parts.*

(Continued)

*Primary Examiner* — Kat Wyrozebski
*Assistant Examiner* — Daniel Lee
(74) *Attorney, Agent, or Firm* — William A. Simons; Keith A. Robertson

(57) ABSTRACT

A solid imaging apparatus and method employing build material transfer means effective to transfer solidifiable liquid build material from a first side of a radiation transparent build material carrier to a receiving substrate without entrapping air bubbles in layers of transferred solidifiable liquid build material and to cleanly separate the solidified build material from the radiation transparent build material carrier as each layer is formed during the layerwise building of a three-dimensional object.

An expandable membrane forming an arcuate dome and a reciprocatible flexible film are employed to effect transfer of the solidifiable liquid build material.

9 Claims, 3 Drawing Sheets

OTHER PUBLICATIONS

Rajan D.S. et al; "CAD Model Slicing and Surface Smoothing for Building Rapid Prototyping Parts"; Industrial Electronics, Control, and Instrumentation 1996, Proceedings of the 1996 IEEE IECON 22nd Int'l Conference on Taipei, Taiwan, Aug. 5, 1996; New York, NY, IEEE, US vol. 3, pp. 1496-1501.

European Search Report EP 1719607 A1 dated Aug. 25, 2006 for European Application EP 06008879; pp. 13-15.

European Office Action in corresponding European Application No. 06008879, mailed on Dec. 21, 2007.

English Translation of DE 19957370A1.

European Search Report for Application No. EP 0912325.8, dated Dec. 3, 2009.

German Office Action in corresponding German Application No. 102006019860.3-53, mailed May 3, 2010 (English translation).

Jamieson, Ron; Hacker, Herbert: Direct slicing of CAD models for rapid prototyping. In: Rapid Prototyping Journal, vol. 1, No. 2, 1995, 1.4-12.

* cited by examiner

BUBBLE-FREE CROSS-SECTIONS FOR USE IN SOLID IMAGING

CROSS-REFERENCE TO RELATED APPLICATIONS

This application is a continuation-in-part application of U.S. application Ser. No. 11/121,348 filed May 3, 2005 now abandoned.

FIELD OF INVENTION

The present invention is directed to forming cross-sectional layers with an image projection system using a solidifiable build material in an apparatus for forming three-dimensional objects on a layer-by-layer basis. More particularly, it is directed to an apparatus and method for forming a cross-section by delivering a solidifiable medium so that air bubbles do not form in the three-dimensional object being built and the layers formed with a liquid medium solidifiable in response to exposure by UV or visible radiation separate without delaminating from a radiation transparent build material carrier.

BACKGROUND OF THE INVENTION

In recent years, many different techniques for the fast production of three-dimensional models have been developed for industrial use. These solid imaging techniques are sometimes referred to as rapid prototyping and manufacturing ("RP&M") techniques. In general, rapid prototyping and manufacturing techniques build three-dimensional objects layer-by-layer from a working medium utilizing a sliced data set representing cross-sections of the object to be formed. Typically, an object representation is initially provided by a Computer Aided Design (CAD) system.

Stereolithography, presently the most common RP&M technique, was the first commercially successful solid imaging technique to create three-dimensional objects from CAD data. Stereolithography may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of material are successively formed and selectively transformed or solidified (i.e. cured) most often using a computer controlled laser beam of ultraviolet (UV) radiation into successive laminae according to the two-dimensional layer data. During transformation, the successive laminae are bonded to previously formed laminae to allow integral formation of the three-dimensional object. This is an additive process. More recent designs have employed the use of visible light to initiate the polymerization reaction to cure the photopolymer build material that is commonly referred to as resin.

Stereolithography represents an unprecedented way to quickly make complex or simple parts without tooling. Since this technology depends on using a computer to generate its cross-sectional patterns, there is a natural data link to CAD/CAM. Such systems have encountered and had to overcome difficulties relating to shrinkage, curl and other distortions, as well as resolution, accuracy, and difficulties in producing certain object shapes. While stereolithography has shown itself to be an effective technique for forming three-dimensional objects, other solid imaging technologies have been developed over time to address the difficulties inherent in stereolithography and to provide other RP&M advantages.

These alternate technologies, along with stereolithography, have collectively been referred to as solid freeform fabrication or solid imaging techniques. They include laminated object manufacturing (LOM), laser sintering, fused deposition modeling (FDM), and various ink jet based systems to deliver either a liquid binder to a powder material or a build material that solidifies by temperature change or photocuring. Most recently a technology using digital light processing technology has employed visible light to initiate the photopolymerization reaction to cure a photopolymer build material, commonly referred to as a resin. Each of these additive technologies have brought various improvements in one or more of accuracy, building speed, material properties, reduced cost, and appearance of the build object.

All of the solid imaging or freeform fabrication techniques, to be successful, must form objects that are near full density or free of unintended voids or air pockets. Voids caused by air pockets create discontinuities and weaknesses in the objects being built, as well as not accurately reproducing the three-dimensional aspect of the object being created from the CAD representation. This problem is especially acute in technologies employing solidifiable liquid resin that is placed down layer-by-layer employing an intermediate transfer process. Although the use of an intermediate transfer surface from which the solidifable liquid resin is transferred to a support platform or an underlying layer of material reduces the amount of excess resin that must be removed from completed parts and eliminates the need to build in a vat or large container of resin, thereby eliminating the cost of additional resin beyond what is necessary to build the then needed parts, it increases the potential for bubble formation in the transferred liquid resin as cross-sections of material are formed.

Additionally, none of the prior solid freeform fabrication approaches, while making substantial improvements, have yet to achieve a truly low cost system that produces highly accurate and visually appealing three-dimensional objects in a short build time.

These problems are solved in the design of the present invention by employing a material transfer technique and apparatus employable in a low cost solid imaging technique with the use of digital imaging projection or laser scanning in a manner that creates a three-dimensional object that accurately reflects the CAD representation without the formation of air pockets in the solidifiable liquid resin.

SUMMARY OF THE INVENTION

It is an aspect of the present invention that a solid imaging apparatus is provided that utilizes a build material transfer means that avoids the formation of air bubbles in the transferred layer of solidifiable liquid build material to achieve high resolution imaging in three-dimensional objects built using UV radiation or visible light and a photopolymer build material.

It is another aspect of the present invention that a solid imaging apparatus is provided that utilizes a build material transfer means that permits the object being formed to separate from a radiation transparent build material carrier without delaminating and remain connected to a receiving substrate as the object is built layer-by-layer.

It is a feature of the present invention that a build material transfer means is employed utilizing an expandable membrane and a radiation transparent build material carrier to cause the solidifiable liquid build material carrier to transfer the build material to a receiving substrate and to have the solidified build material separate cleanly and without delamination from the solidifiable liquid build material carrier.

It is another feature of the present invention that the expandable membrane is an abrasion-resistant, radiation transparent material retained in a frame on the solid imaging apparatus.

It is yet another feature of the present invention that the expandable membrane is pneumatically expandable and retractable.

It is still another feature of the present invention that the expandable membrane forms an arcuate dome shape when pneumatically expanded so as to contact the radiation transparent build material carrier initially at the highest point of the dome and then sequentially at lower points on its surface when brought into contact with the radiation transparent build material carrier.

It is a further feature of the present invention that solidifiable liquid build material is sequentially transferred from a flexible radiation transparent build material carrier to a receiving substrate so that there is no relative motion between the build material carrier and the substrate and no air bubbles are trapped in the transferred build material.

It is yet another feature of the present invention that the expandable membrane forms an arcuate dome shape when pneumatically expanded so as to cause the radiation transparent build material carrier to separate from the solidified build material after exposure initially at the lowest points of the dome and then sequentially at higher points on its surface when expanded after exposure to break contact of the radiation transparent build material carrier with the solidified build material.

It is an advantage of the present invention that a low cost solid imaging device is obtained that provides high resolution and bubble-free three-dimensional objects.

It is another advantage of the present invention that the expandable membrane design is simple and effective in producing bubble-free three-dimensional objects built layer-by-layer.

These and other aspects, features, and advantages are obtained by the present invention through the use of a solid imaging apparatus and method that employ build material transfer means to transfer solidifiable liquid build material from a radiation transparent build material carrier to a receiving substrate in a bubble-free fashion and to cleanly separate the solidified build material from the radiation transparent build material carrier as each layer is formed in an object built layer-by-layer. In one embodiment an expandable radiation transparent membrane is employed which initially contacts the radiation transparent build material carrier at a high point and then sequentially contacts at lower points to effect transfer of the build material to a receiving substrate without entrapping air bubbles in the layers of transferred build material as a three-dimensional object is formed layer-by-layer. After exposure and solidification of the build material the expandable radiation transparent membrane is expanded to sequentially separate the solidified build material from the radiation transparent build material carrier at the lowest points and then at higher points to break contact of the radiation transparent build material carrier with the solidified build material. In a second embodiment, a flexible radiation transparent build material carrier is sequentially brought into contact with the receiving substrate so there is no relative motion between the receiving substrate and the build material carrier to effect a bubble-free transfer of solidifiable liquid build material as a three-dimensional object is formed layer-by-layer.

BRIEF DESCRIPTION OF THE DRAWINGS

These and other aspects, features and advantages of the invention will become apparent upon consideration of the following detailed disclosure of the invention, especially when taken in conjunction with the following drawings wherein.

DETAILED DESCRIPTION OF THE PREFERRED EMBODIMENT

Flexible transport solid imaging of the type disclosed herein involves the layer-by-layer build-up of articles from a visible or UV radiation curable liquid photopolymer material that is delivered by the flexible transport endless belt or reciprocatable sheet of film. Liquid photopolymer material is applied to the endless belt or reciprocatable sheet of film from a cartridge employing an appropriate coating device such as a gravure wheel that picks up the photopolymer and transfers it to the flexible transport device to provide a fresh material to create new layers as the three-dimensional object is built. The photopolymer build material is transferred via transfer means to a receiving substrate without entrapping air bubbles in the transferred layers. The photopolymer build material is imaged by radiation projected from either a digital UV projector or a digital visible light projector and solidified layer-by-layer. The projector includes a spatial light modulator, such as a digital micro-mirror device ("DMD") that selectively illuminates pixels for imaging. Visible light projection is a preferred approach.

Solid imaged parts are preferably built on an elevator platform that moves the build object or part up into contact with the liquid photopolymer build material and, after exposure, down and out of contact with the liquid photopolymer build material as successive layers or laminae are formed during the building process. The build object can be built on structures known as supports rather than directly on the elevator platform. Supports are used for more complex three-dimensional objects being built that have unsupported or partially unsupported surfaces.

Commercially available digital light projectors, optionally modified to have a shorter focal length, may be employed, such as those available from InFocus Corporation of Wilsonville, Oreg. and BenQ America Corp. of Irvine, Calif.

In one application of the present invention, the photopolymer build material is delivered to the imaging area via a radiation transparent flexible build material carrier film, such as polypropylene or polycarbonate. The photopolymer build material is applied in a thin layer to the flexible transport film in the embodiment shown in FIG. 1.

Figure 1:
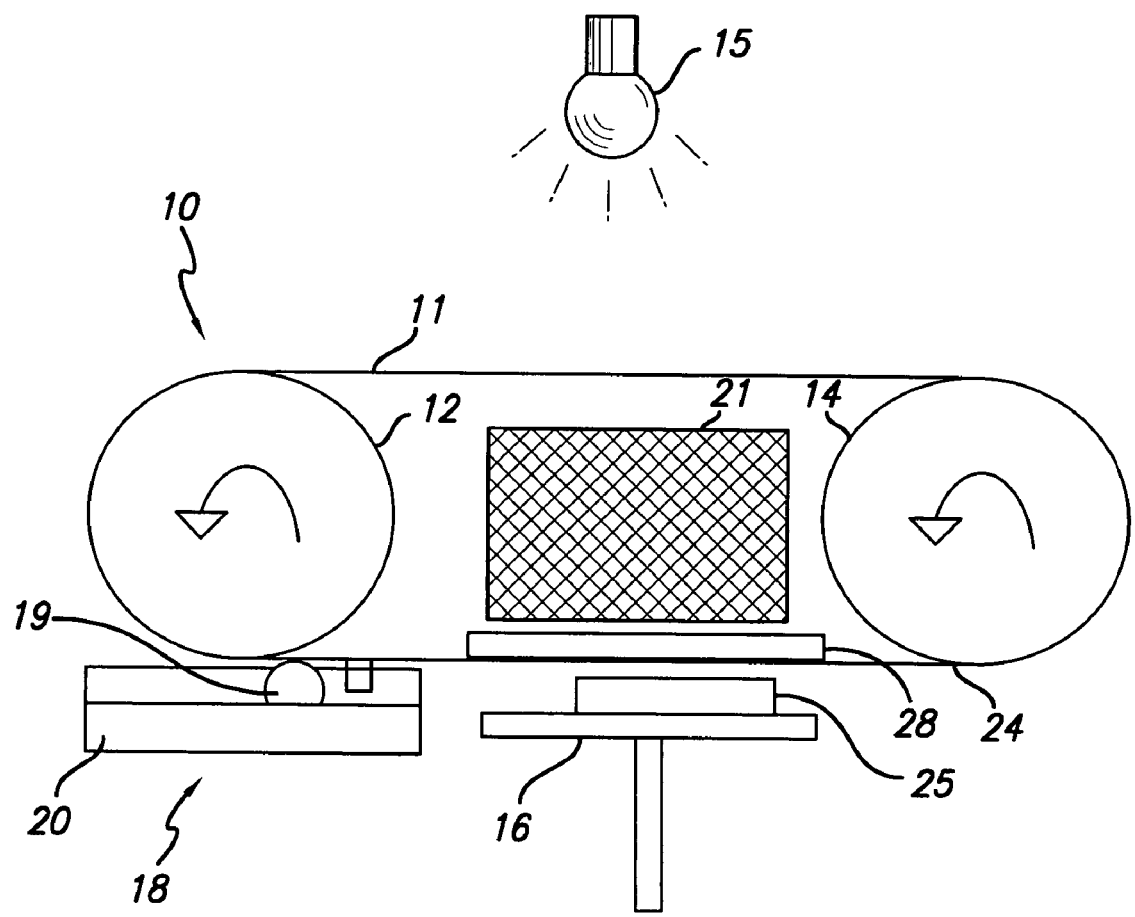
FIG. 1 is a diagrammatic illustration of a flexible transport solid imaging system utilizing a build material transfer means showing an expandable membrane in a fully flattened or unexpanded position.

As seen in FIG. 1, a flexible transport imaging system indicated generally by the numeral 10, has a radiation transparent build material carrier in the form of an endless belt 11 that is positioned about a driving roller 12 and a follower roller 14. A digital light projector is the radiation source 15 that projects an image with selected pixels for illumination onto a mirror (not shown) below the upper run of endless belt 11 in the exposure of a cross-section of a three-dimensional object 25 being formed on a support platform 16. Support platform 16 is raised and lowered to bring the cross-sectional layers being formed into contact with the layer of resin or solidifiable liquid build material 24 that is deposited on endless belt 11 from the resin or solidifiable liquid medium cartridge indicated generally by the numeral 18. Cartridge 18 includes a resin reservoir of solidifiable liquid medium 20 and a gravure roller 19 that applies the solidifiable liquid medium to belt 11. A sub-pixel image placement device, indicated generally by the numeral 21, is placed between the radiation light source 15 and the target area on the belt 11 that is coated with the solidifiable liquid build material 24. The exposure of the image cross-section by illuminating selected pixels creates a solidified portion of the cross-section of the three-dimensional object being formed. Device 21 alternatively can be a mirror with the pixel shifting device being located outside of the runs of the endless belt 21 or it could combine both the mirror and the pixel shifting device in a single element. An expandable membrane 26, best seen in FIGS. 2 and 3, mounted to a membrane frame 28 is positioned just above the endless belt 11 to bring the radiation transparent endless belt 11 that is coated on a first side with the solidifiable liquid build material into contact with the receiving substrate, such as three-dimensional object 25. Membrane 26 is also radiation transparent and made of an appropriate material such as polyethylene or polypropylene.

Figure 2:
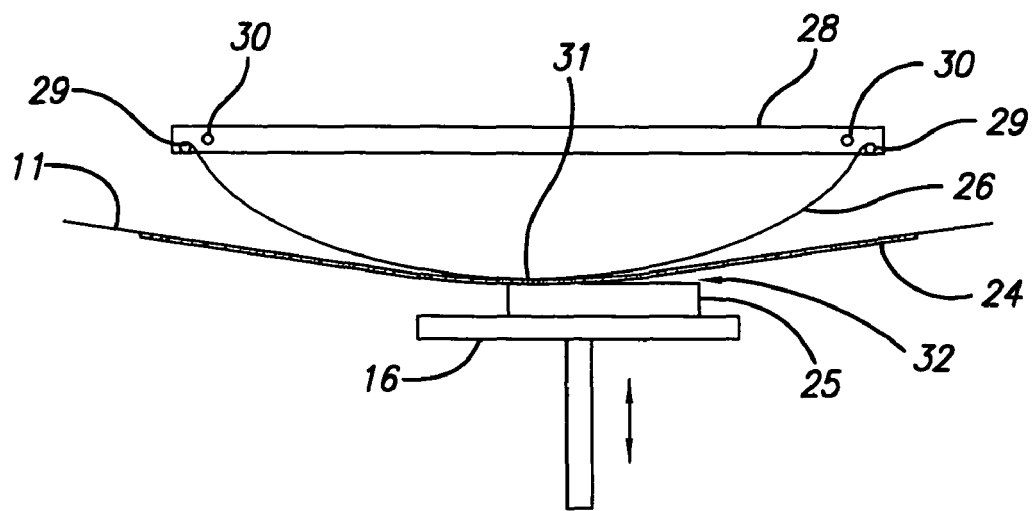
FIG. 2 is a diagrammatic illustration of a fully expanded membrane in contact with the build material carrier at the high point of the expanded arcuate dome.

Looking now at FIG. 2, there is shown a diagrammatic illustration of the expandable membrane 26 in its inflated or expanded arcuate domed configuration. FIG. 2 is shown in an exaggerated enlargement to more clearly illustrate the expansion that occurs. The actual displacement, depending upon the distance between driving roller 12 and follower roller 14, can be as small as about 0.025 inches from the normal path of belt 11 when the membrane 26 is not expanded. Membrane 26 is retained in a frame 28 fixably fastened to the apparatus utilized to form three-dimensional objects (not shown). Frame 28 is made of any radiation transparent appropriate material, such as plastic. Preferably frame 26 is a machined sheet of plexiglass that is radiation transparent in the area overlying the image plane and the receiving substrate. Alternatively a plate of glass affixed sealingly to a machinable or otherwise formable periphery fixture may be employed. The membrane 26 is retained in groove 29 into which a retainer, such as an O-ring, is placed. The groove 29 extends about the periphery of the frame 28. Frame 28 can be of any appropriate geometric shape, such as rectangular, square, pentagonal, oval, or circular with a closed side opposite the membrane 26 to create a space therebetween for air to fill. A circular shape is preferred. Air passages 30 are provided in frame 28 that connect to a source of air (also not shown). Air is forced into the space between the frame 28 and the membrane 26 to pneumatically inflate or expand the membrane to form the arcuate domed configuration. It should be noted that alternatively any suitable gas may be employed, such as carbon dioxide or nitrogen.

In the expanded configuration seen in FIG. 2, the membrane has a high point 31 with lower points about its domed surface extending downwardly toward the groove 29. As seen in FIG. 2, the high point or contact point 31 of the expanded membrane 26 contacts the opposing second side of the endless belt 11 and presses belt 11 at the high point 31 into contact with the receiving substrate that is support platform 16 or is supported by support platform 16. Solidifiable liquid build material 24 that has been applied to the first side of the endless belt is transferred to a receiving substrate that is either the support platform 16 or the three-dimensional object 25 as it is built layer-by-layer. The first layer of solidifiable liquid build material 24 that is applied is applied directly to the surface of the support platform 16 and all subsequent layers of solidifiable liquid build material 24 are applied to the solidified cross-sections of the three-dimensional object 25 that are formed upon exposure by the radiation source 15. Support platform 16 is moveable between a lowered position and a raised position where it is brought into contact with the solidifiable liquid build material 24 on the first side of endless belt 11. As seen in FIG. 2, the contact of the high point 31 of the arcuate domed membrane 26 with the opposing second side of the endless belt 11 creates air gaps indicated generally by the numeral 32 out of which air may be forced and escape as the support platform 16 is raised and the arcuate domed shape of membrane 26 is flattened.

Figure 3:
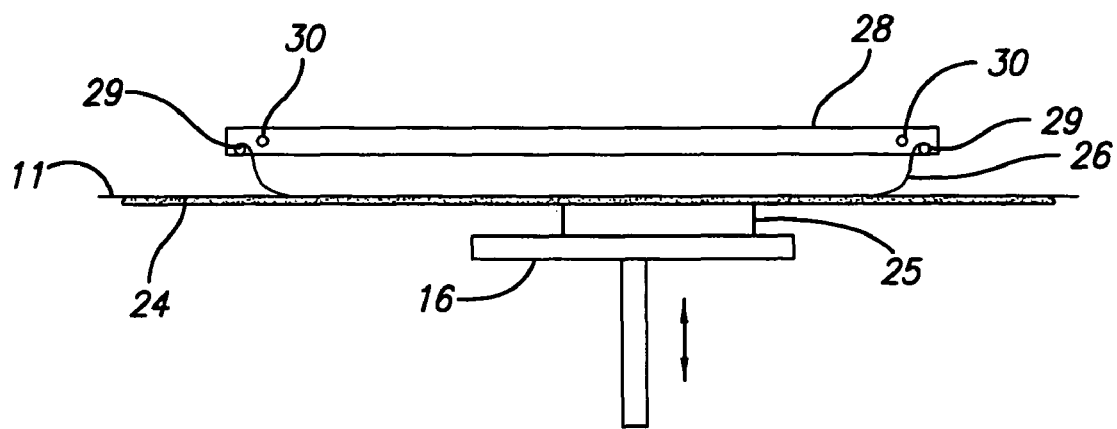
FIG. 3 is a diagrammatic illustration of an expandable membrane in a partially expanded or flattened condition in contact with the build material carrier at a raised position of the support platform holding the three-dimensional object.

FIG. 3 shows the support platform 16 in a raised position with the three-dimensional object 25 in contact with the solidifiable liquid build material 24 on the first side of the endless belt 11. Air has been expressed out of the space or the gaps 32 between the build object and the layer of solidifiable liquid build material 24 on the endless belt 11 in a manner effective to avoid entrapment of air bubbles. In this position, air has been forced back out of the space between the membrane 26 and frame 28 through the air passages 30 as the expandable and retractable membrane 26 has been compressed and flattened. As the membrane 26 is compressed by the upward movement of the support platform 16, the first side of the radiation transparent build material carrier, in this embodiment belt 11, with the solidifiable liquid build material 24 thereon is sequentially brought into contact with and the build material 24 is transferred to the receiving substrate that is the cross-section of the three-dimensional object 25 being formed. After the high point 31 of the membrane 26 causes the solidifiable liquid build material 24 on the first side of the portion of belt 11 immediately opposite the high point 31 to initially contact the receiving substrate, lower points on the arcuate domed surface of the expanded membrane 26 cause the solidifiable liquid build material 24 on the corresponding opposite portions of belt 11 to also contact and be transferred to the receiving substrate that is the cross-section of three-dimensional object 25 being formed. When the membrane 26 is in the fully compressed position it is flat against the frame 28 and the planar surface of the closed side of frame 28 helps compress the layer of solidifiable liquid build material 24 to the proper thickness. With the endless belt 11 in a stopped position and the membrane 26 fully compressed, the radiation source 15 of FIG. 1 is energized to selectively image-wise expose and solidify the build material 24. After solidification the support platform 16 is lowered to repeat the process and permit a fresh layer of solidifiable liquid build material 24 to be deposited on the receiving substrate that is now the just exposed and solidified build material forming the uppermost layer or cross-section of the three-dimensional object 25 being built.

The expandable membrane 26 may also be inflated as the support platform 16 is lowered to facilitate the separation or peeling away of the solidified build material in the exposed cross-section and from the belt 11 and the unexposed liquid build material 24. The expandable membrane 26 is inflated again to cause the exposed and now solidified layer of build material to separate cleanly from the radiation transparent endless belt 11 without delamination of the already solidified layers or partial separation from the endless belt 11 of the current exposed and solidified layer. This is effected by the membrane 26 initially causing the solidified build material to separate from the endless belt 11 at the lowest points on the arcuate dome and then sequentially at higher points as the membrane 26 is inflated until only the highest point of the arcuate dome is left to separate the build material from the endless belt 11 when the support platform 16 is lowered. The lowering of the support platform 16 then permits the belt 11 to resume its movement and deliver a fresh layer of resin or solidifiable liquid build material 24 that is deposited on endless belt 11 from the resin or solidifiable liquid medium cartridge 18 so the layerwise building process can continue until a three-dimensional object 25 is completed.

Figure 4:
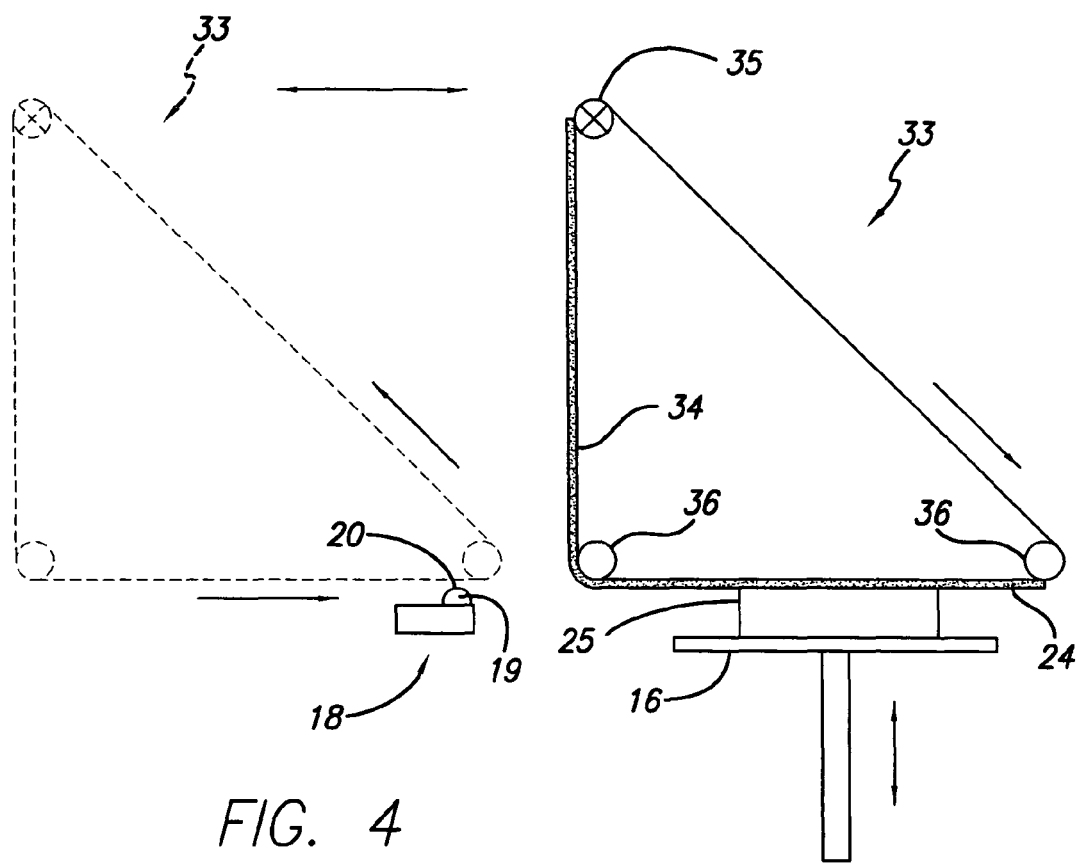
FIG. 4 is a diagrammatic illustration of an alternative embodiment of a build material transfer means employing a reciprocatable module.

FIG. 4 shows an alternative embodiment employing a flexible film that is mounted reciprocatibly on a reciprocating carriage indicated generally by the numeral 33 below the radiation source 15 of FIG. 1. Carriage 33 has a radiation transparent build material carrier 34 that is the flexible film arrayed over two sides of a triangle between drive roller 35 and guide rollers 36. The flexible film is connected on the third side by appropriate cabling on opposing ends to complete the enclosure or formation of the triangular pattern. The support platform 16 is moveable downwardly so that as the three-dimensional object 25 is formed, the platform is lowered one layer or cross-section thickness prior to being recoated with solidifiable liquid build material 24. The rightmost guide roller 36 helps compress the layer of solidifiable liquid build material 24 to the proper thickness. The cartridge 18 containing the solidifiable liquid build material that is applied via a gravure roller 19 is illustrated in its relative position between the recoating position shown in phantom lines and the solidifiable liquid build material transfer position shown in solid lines. The reciprocatible carriage 33 moves from left to right from a coating position to an application position and the radiation transparent build material carrier 34 is reciprocatibly moved by the drive roller 35 about guide rollers 36 in such a manner that there is no relative motion between the radiation transparent build material carrier and the receiving substrate which is either support platform 16 for the first layer or the three-dimensional object 25 for subsequent layers. There is no horizontal motion of the radiation transparent build material carrier 34 with the solidifiable liquid build material 24 and three-dimensional object 25 because the build material is applied with no horizontal force on the three-dimensional object 25. This is accomplished by adjusting the velocity and acceleration of both the reciprocatible carriage 33 and the radiation transparent build material carrier 34. In this manner, no air bubbles are trapped in the transferred solidifiable liquid build material. Additionally fine features and delicate details on object 25 can be made. Further, the radiation transparent build material carrier 34 peels away from the exposed and solidified layer of build material 24 forming the cross-section of the three-dimensional object 25 being formed with no horizontal motion therebetween.

Drive roller 35 preferably is gear driven and the cabling is a composite gear belt with teeth such that two belts connect the polypropylene or polycarbonate flexible film that forms the radiation transparent build material carrier 34 along the build material carrier's outer edges. Thus the area between the gear belts is open to permit the radiation source 15 to illuminate the image plane and the solidifiable liquid build material 24 on the radiation transparent build material carrier 34 unobstructed while the carriage 33 is in a stationary position after the solidifiable liquid build material 24 has been transferred to the receiving substrate.

Figure 5:
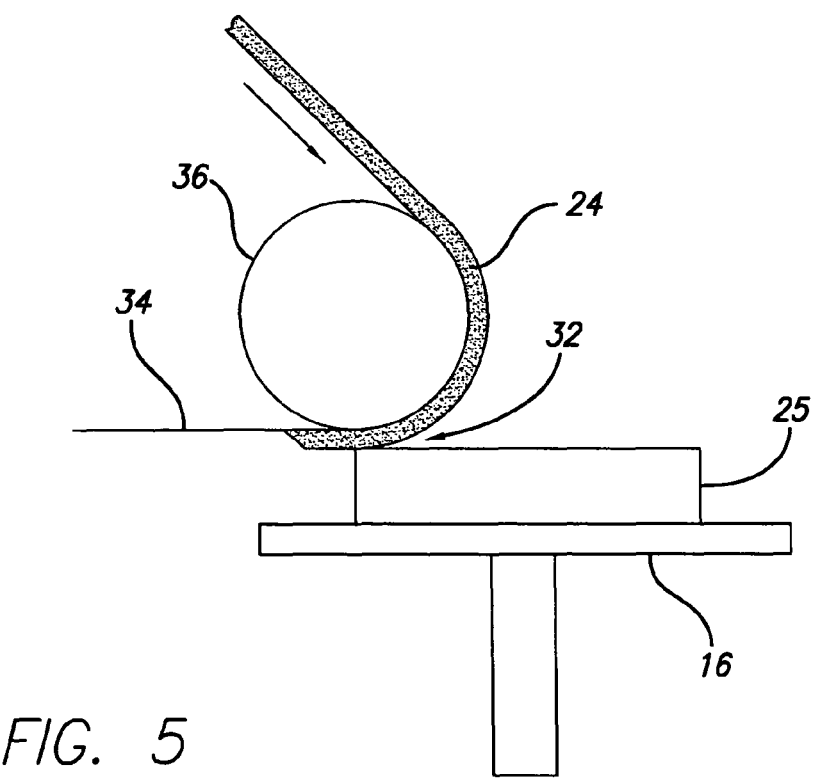
FIG. 5 is a partial enlarged diagrammatic illustration of the embodiment in FIG. 4 showing build material at the point of transfer to a three-dimensional object on the support platform.

The transfer is best illustrated diagrammatically in enlarged fashion in FIG. 5 wherein guide roller 36 is shown having the radiation transparent build material carrier 34 wrapped about it with the solidifiable liquid build material 24 on the first side sequentially being placed into contact with the receiving substrate that is the previously exposed layer of three-dimensional object 25. As illustrated in this view, the air gap 32 exists to permit air bubbles to escape out of the space between the receiving substrate and the layer of solidifiable liquid build material 24 being transferred to the receiving substrate. In this embodiment the sequential transfer of the solidifiable liquid build material 24 occurs as successive points of the radiation transparent build material carrier 34 pass about the bottom of roller 36 causing the build material 24 to contact and transfer to the receiving substrate which is the cross-section of the three-dimensional object 25 being formed. After exposure the carriage 33 returns to the leftmost position shown in dotted lines in FIG. 4 and the radiation transparent build material carrier 34 reverses direction to separate from the unexposed liquid build material 24 and the carrier 34 one line at a time transversely across the width of the carrier 34 to peel away from the exposed and solidified build material about the guide roller 36. The flexibility of the radiation transparent build material carrier 34 enables the separation to occur in a peeling type of action because the separation force is proportional to the width of the exposed area of the build material 24 as opposed to the total area of the exposed build material, as occurs in the case of an inflexible planar surface. The use of a roller about which the radiation transparent build material carrier 34 passes makes the release or peeling effects predictable because of the constant horizontal and vertical forces stemming from the use of a fixed radius roller. Additionally in this embodiment and the embodiment illustrated in FIGS. 1-3, the force to break the vacuum between the radiation transparent build material carrier 34 and the solidified build material 24 is eliminated since the peeling action allows air to enter between the two surfaces in marked contrast to what occurs with an inflexible planar surface. Both embodiments permit the separation of the unexposed build material and the radiation transparent build material carrier 34 from the solidified build material without damaging the object being formed or causing the loss of delicate features.

Data to build a three-dimensional object is sent to the solid imaging system from a CAD station (not shown) that converts the CAD data to a suitable digital layer data format and feeds it to a computer control system (also not shown) where the object data is manipulated to optimize the data via an algorithm to provide on/off instructions for the digital light projector. The solid imaging layer data is attained by the CAD data being processed by a slicing program to create cross-sectional data. An algorithm is then applied to the cross-sectional data by a suitable controller, such as a microprocessor or computer, to create the instructions for the digital light projector to illuminate selected pixels in the image within the boundary of the three-dimensional object in the cross-section being formed. The algorithm can select pixels for illumination that are only full pixels within the boundary of the image in the cross-section being exposed. The exposure can be accomplished in multiple exposures of a cross-sectional layer, so that, for example, a second exposure of the same cross-sectional layer is done with the pixels shifted in the X and Y directions. The resultant exposure on the same cross-sectional layer of the two exposures produces a higher resolution and an object cross-section with smoother edges. Alternatively as desired, different algorithms can be used to select as pixels for illumination only those pixels having a desired percentage, ranging from about 1% to about 100%, of the full pixel within the boundary of the image in the cross-section being exposed depending upon the number of exposures and pixel shifts to be done within each cross-section. Additionally, the algorithm employed may factor in the area of the pixel within the boundary of the image in the cross-section separately or in combination with a selected angle that the image boundary goes through the pixels within the image in the cross-section being exposed. At some desired percentage of pixels within the boundary of the cross-section being exposed, the image will be larger than desired. In this instance some "line width correction" of the cross-section's boundary will be required. Where supports are used in the build process, either with two separate materials or one material that is the same for the build object and the supports, no pixel shifting or second exposure in each support cross-section is utilized in a second support generating algorithm and any pixel having any portion of a support within the boundary of the image is illuminated.

As previously stated, either an ultraviolet ("UV") digital radiation projector or a visible digital light projector system may be used to cure the photocurable solidifiable liquid build material. With either type of a digital light projector, an algorithm that selects out pixels in a cross-section that have previously been exposed can be employed to prevent over curing of the resin in those areas. Such over curing can cause part curl, shrinkage and part distortion. Additionally, it is possible to convert the image boundaries to a bit map and then shift only those pixels that contain the boundaries to obtain the required sub-pixel placement accuracy edge smoothness. Alternatively laser scanning can be used with UV radiation or visible light to vector scan and expose the solidifiable liquid build material.

Any suitable fluid build material capable of solidification in response to the application of an appropriate form of energy stimulation may be employed in the practice of the present invention. Many liquid state chemicals are known which can be induced to change to solid state polymer plastic by irradiation with UV radiation or visible light. A suitable visible light curable photopolymer that may be employed in the practice of the present invention is shown in Table I below. This formulation exhibited excellent resolution and photospeed when utilized with a BenQ PB7220 projector. The parts created displayed outstanding green strength with balanced stiffness and toughness.

TABLE 1

| | Units of Weight | Weight Percent |
|---|---|---|
| Acrylate-24 (from Sartomer Company) | | % |
| PRO 6817 (from Sartomer Company) | 4.8 | 23.02 |
| SR 833S (from Sartomer Company) | 3.5 | 16.79 |
| Ebecryl 83 (from UCB Chemicals Corp.) | 2.4 | 11.51 |
| PRO 6169 (from Sartomer Company) | 5.2 | 24.94 |
| SR 531 (from Sartomer Company) | 3.6 | 17.27 |
| Irgacure I-907 (From Ciba Specialty Chemicals, Inc.) | 0.75 | 3.60 |
| Irgacure I-819 (From Ciba Specialty Chemicals, Inc.) | 0.6 | 2.88 |
| Total | 20.85 | 100.00 |

Additives can be incorporated into the formulation to promote release ability from the transparent transport means, such as silicone acrylate materials.

While the invention has been described above with references to specific embodiments thereof, it is apparent that many changes, modifications and variations in the materials, arrangements of parts and steps can be made without departing from the inventive concept disclosed herein. For example, where a laser, laser scanning mirrors and other related apparatus are employed in lieu of digital image projection equipment, there is no sub-pixel image placement device employed. Additionally, it is to be understood with respect to the embodiment shown in FIGS. 4 and 5 that although shown and described as having the radiation transparent build material carrier being arrayed in a triangular pattern about rollers, that any number of different guides forming an appropriate geometric shape, such as a rectangle, square or pentagon, etc. could be employed. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A method for forming a three-dimensional object layer-by-layer comprising the steps of:
   a. receiving three-dimensional CAD data of an object to be built;
   b. processing the three-dimensional CAD data to receive cross-sectional image data representative of cross-sectional layers of the object;
   c. delivering a solidifiable liquid build material to an imaging area via a radiation transparent build material carrier having a first side and an opposing second side, wherein the radiation transparent build material carrier is reciprocatibly mounted about a plurality of rollers on a reciprocatible carriage that moves the radiation transparent build material carrier from a coating position to an application position, wherein the radiation transparent build material carrier forms an endless formation on the reciprocatible carriage;
   d. transferring at the application position the solidifiable liquid build material from the radiation transparent build material carrier to a receiving substrate wherein the solidifiable build material contacts the receiving substrate sequentially in order to avoid entrapment of air bubbles in the transferred solidifiable liquid build material; and
   e. projecting an image representative of cross-sectional image data from a radiation source through the radiation transparent build material carrier to selectively illuminate pixels in an image plane in a first exposure to selectively solidify the liquid build material.

2. The method according to claim 1 further comprising the radiation transparent build material carrier comprising a flexible film.

3. The method according to claim 1 further comprising the plurality of rollers being three rollers in a triangular pattern.

4. The method according to claim 1 further comprising having the radiation transparent build material carrier communicating with a source of solidifiable liquid build material after each pass across the image plane to receive additional solidifiable liquid build material.

5. The method according to claim 1 further comprising transferring the solidifiable liquid build material to the receiving substrate with no relative motion between the radiation transparent build material carrier and the receiving substrate.

6. The method according to claim 5 further comprising the radiation transparent build material carrier peeling away from solidified build material in a formed layer of the three-dimensional object with no relative motion therebetween.

7. The method according to claim 1 further comprising a radiation source being selected from the group consisting of a UV radiation source and a visible light source.

8. The method according to claim 1 wherein the radiation transparent build material carrier is connected by cabling to form the endless formation on the reciprocatible carriage.

9. The method according to claim 8 wherein the cabling comprises a composite gear belt with teeth.

* * * * *